United States Patent [19]

Matsumoto et al.

[11] Patent Number: 4,923,178

[45] Date of Patent: May 8, 1990

[54] FLUID-FILLED CYLINDRICAL ELASTIC MOUNT

[75] Inventors: Nobuo Matsumoto, Nagoya; Keita Shiraki, Kasugai; Yoshiki Funahashi, Iwakura, all of Japan

[73] Assignee: Tokai Rubber Industries, Ltd., Aichi, Japan

[21] Appl. No.: 364,606

[22] Filed: Jun. 12, 1989

[30] Foreign Application Priority Data

Jun. 17, 1988 [JP] Japan ............... 63-81020[U]

[51] Int. Cl.$^5$ ............................................. F16F 5/00
[52] U.S. Cl. ................................. 267/140.1; 267/219
[58] Field of Search ................. 123/192 R; 248/562; 267/140.1 R, 140.1 C, 218, 219

[56] References Cited

U.S. PATENT DOCUMENTS

| | | | |
|---|---|---|---|
| 4,690,389 | 9/1987 | West | 267/140.1 |
| 4,749,173 | 6/1988 | Kanda | 267/140.1 |
| 4,756,514 | 7/1988 | Kanda | 267/140.1 C |
| 4,786,036 | 11/1988 | Kanda | 267/140.1 C |
| 4,840,357 | 6/1989 | Jouade | 267/140.1 C |

Primary Examiner—Duane A. Reger
Attorney, Agent, or Firm—Oliff & Berridge

[57] ABSTRACT

A fluid-filled cylindrical elastic mount including an inner and an outer sleeve; an elastic body interposed between the inner and outer sleeves; a rigid sleeve disposed over at least an outer circumferential surface of opposite axial end portions of the elastic body; a pressure-receiving chamber provided between the inner and outer sleeves, filled with a non-compressible fluid, and receiving a vibrational load to be damped; an equilibrium chamber provided between the inner and outer sleeves, filled with the fluid, and at least partially defined by a flexible wall; a restricted passage for restricted fluid communication between the pressure-receiving and equilibrium chambers; a recess-defining member disposed between the inner and outer sleeves, for defining a radially outwardly opening recess, the outer sleeve covering the recess to provide a space of a predetermined volume; and an elastic sleeve for fluid-tight sealing between the outer and rigid sleeves. A portion of the elastic sleeve which is aligned with the space, is spaced apart from the outer sleeve so as to provide a flexible diaphragm in the space, the flexible diaphragm serves as the flexible wall, and the equilibrium chamber is provided in the space. The rigid sleeve and the recess-defining member may be constituted by a single generally cylindrical member.

16 Claims, 6 Drawing Sheets

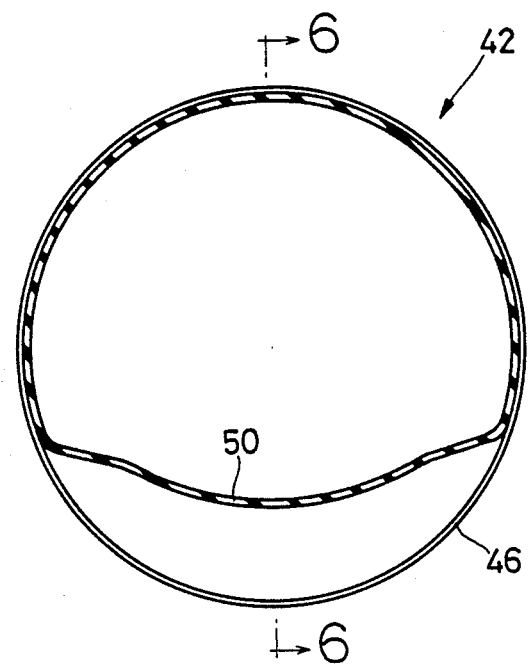
FIG.5
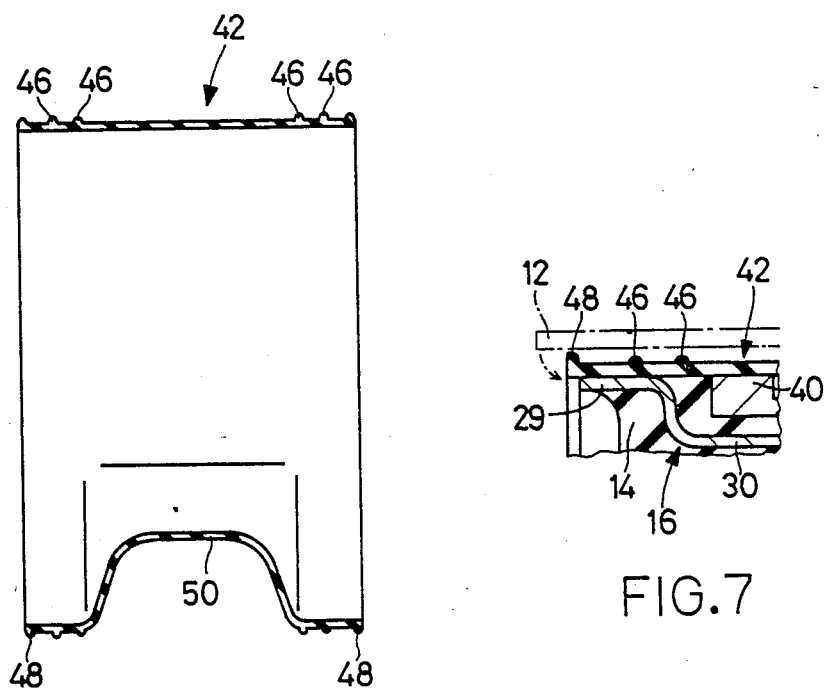
FIG.6
FIG.7

FLUID-FILLED CYLINDRICAL ELASTIC MOUNT

BACKGROUND OF THE INVENTION

1. Field of the Invention

The present invention relates in general to a fluid-filled cylindrical elastic mount, and in particular to such an elastic mount which has a pressure-receiving chamber and an equilibrium chamber each filled with a suitable non-compressible fluid, and damps vibrations based on fluid resistance to flows of the fluid between the two chambers.

2. Discussion of the Prior Art

There is known a cylindrical elastic mount which is used as a vibration-damping mounting device or connecting device such as an engine mount and a suspension bushing for automotive vehicles. The cylindrical elastic mount includes an inner and an outer sleeve which are disposed concentric or eccentric with each other, and an elastic member of rubber interposed between the two sleeves for flexible connection therebetween.

Recently, there has been used a "fluid-filled" cylindrical elastic mount which has a plurality of pockets formed in the elastic member thereof and opening in an outer circumferential surface of the elastic member, and at least one metallic sleeve disposed over at least the outer circumferential surface of opposite axial end portions of the elastic member. In this elastic mount, the outer sleeve is fitted on the outer circumferential surface of the elastic member via the at least one metallic sleeve and a rubber sleeve for fluid-tight sealing between the metallic sleeve and the outer sleeve. The plurality of pockets are filled with a suitable non-compressible fluid so as to provide a plurality of fluid chambers in the elastic mount. The plurality of fluid chambers are held in fluid communication with each other through a restricted passage, i.e., an orifice. Upon application of vibrations to the elastic mount, the orifice exhibits a resistance to the fluid flowing therethrough, or the fluid existing in the orifice resonates, thereby damping the vibrations.

An example of the fluid-filled cylindrical elastic mount of the above-described type is disclosed by U.S. Pat. No. 4,749,173 (published on June 7, 1988). The disclosed elastic mount has a plurality of fluid chambers, one of which serves as a pressure-receiving chamber whose fluid pressure is changed, upon application of vibrations to the bushing, due to relative displacement of the inner and outer sleeves thereof. The plurality of fluid chambers also include at least one volume-variable equilibrium chamber which is at least partially defined by a flexible diaphragm and whose change in fluid pressure is accommodated by elastic deformation of the flexible diaphragm. Upon input of vibrations to the elastic mount, the fluid flows between the pressure-receiving and equilibrium chambers via a restricted passage or an orifice due to pressure change produced in the pressure-receiving chamber, so as to damp the vibrations.

In the above fluid-filled elastic mount, the elastic member has an axial recess formed through a portion thereof which portion is subjected to tensile stress due to a static load upon installation thereon of a load member to be supported thereby, namely, upon application thereto of the weight of a load member. The axial recess contributes to minimizing the tensile stress produced in the portion in question of the elastic member. Thus, the durability of the elastic member is improved.

However, the above-indicated prior art elastic mount suffers from a problem that the flexible diaphragm associated with the equilibrium chamber is excessively largely expanded or elastically deformed due to an excessive amount of fluid flowing from the pressure-receiving chamber into the equilibrium chamber through the orifice as a result of an extremely increased fluid pressure in the pressure-receiving chamber upon application of a large vibrational load to the mount. Consequently the flexible diaphragm tends to be deteriorated. The deteriorated diaphragm may not accommodate a largely increased volume of the equilibrium chamber and in such a case may break. Thus, the durability and reliability of the flexible diaphragm, and accordingly those of the elastic mount itself, have been unsatisfactory.

SUMMARY OF THE INVENTION

It is therefore an object of the present invention to provide a fluid-filled cylindrical elastic mount wherein a flexible diaphragm at least partially defining an equilibrium chamber thereof, and accordingly the elastic mount as a whole, have improved durability together with simple construction, and are manufactured without complicated processes or increased cost.

The above object can be achieved according to the present invention, which provides a fluid-filled cylindrical elastic mount comprising (a) an inner sleeve; (b) an outer sleeve disposed outwardly of the inner sleeve such that an axis of the inner sleeve and an axis of the outer sleeve are parallel to each other; (c) an elastic body interposed between the inner and outer sleeves for elastic connection therebetween, (d) rigid sleeve means disposed over at least an outer circumferential surface of opposite axial end portions of the elastic body, the outer sleeve being fitted on the elastic body via the rigid sleeve means; (e) means for defining a pressure-receiving chamber between the inner and outer sleeves, the pressure-receiving chamber being filled with a non-compressible fluid, and receiving a vibrational load to be damped by the elastic mount; (f) means for defining an equilibrium chamber between the inner and outer sleeves, the equilibrium chamber being filled with the non-compressible fluid, and at least partially defined by a flexible wall; (g) means for defining a restricted passage for restricted fluid communication between the pressure-receiving and equilibrium chambers; (h) recess-defining means disposed between the inner and outer sleeves, for defining a radially outwardly opening recess, the outer sleeve covering the recess to provide a space of a predetermined volume; (i) an elastic sleeve for fluid-tight sealing between the outer sleeve and the rigid sleeve means; and (j) a portion of the elastic sleeve which is aligned with the space, being spaced apart from the outer sleeve so as to provide a flexible diaphragm in the space, the flexible diaphragm serving as the flexible wall, the equilibrium chamber being provided in the space.

In the fluid-filled cylindrical elastic mount of the invention constructed as described above, the equilibrium chamber is provided in the space defined by and between the outer sleeve and the recess-defining means. The flexible diaphragm at least partially defining the equilibrium chamber, is advantageously prevented from being excessively largely expanded, by eventually contacting with the wall defining the space. Therefore, the durability of the flexible diaphragm, and accordingly that of the elastic mount itself, are improved.

Further, since the flexible diaphragm is formed as an integral part of the rubber sleeve provided between the metallic sleeve and the outer sleeve for fluid-tight sealing therebetween, the present elastic mount is manufactured without increasing the number of parts or elements required or complicating the construction thereof.

According to a feature of the present invention the recess-defining means is formed integral with the rigid sleeve means, so as to provide a generally cylindrical rigid member.

According to another feature of the invention, the equilibrium chamber is defined by the flexible diaphragm and the recess-defining means. In this case, the means for defining a restricted fluid passage may be provided between the elastic sleeve and the elastic member. Also, the means for defining a restricted passage may comprise a circumferential recess formed in an outer circumferential surface of an intermediate portion of the elastic body, and a cylindrical passage-defining member fitted in the circumferential recess, the cylindrical passage-defining member cooperating with the elastic sleeve to define the restricted passage which communicates with the pressure-receiving and equilibrium chambers.

According to yet another feature of the invention, the equilibrium chamber is defined by the elastic diaphragm and the outer sleeve. In this case, the means for defining a restricted fluid passage may be provided between the elastic sleeve and the outer sleeve. Also, the means for defining a restricted passage may comprise a circumferential recess formed in an outer circumferential surface of an intermediate portion of the elastic body, and a cylindrical passage-defining member fitted in the circumferential recess via the elastic sleeve disposed therebetween, the cylindrical passage-defining member cooperating with the outer sleeve to define the restricted passage which communicates with the pressure-receiving and equilibrium chambers.

According to a further feature of the invention, the pressure-receiving chamber and the equilibrium chamber are provided opposite to each other in a diametric direction in which the elastic mount primarily receives vibrations. In this case, the inner and outer sleeves may be eccentric with each other in the diametric direction.

According to a still further feature of the invention, the elastic mount further comprises a restrictor member extending through the elastic body in an axial direction of the elastic body, and the elastic body has an axial void formed therethrough, the restrictor member being extending through the axial void.

In a preferred embodiment of the elastic mount of the invention, the elastic body has an axial recess which is divided by the recess-defining means into a pair of inner and outer sections, the outer section serving as the radially outwardly opening recess.

In another embodiment of the elastic mount of the invention, the pressure-receiving chamber has a restricted portion which provides a resistance to a flow of the non-compressible fluid from one part of the pressure-receiving chamber to another.

In yet another embodiment of the invention, the elastic mount further comprises a plate-like member exposed to the pressure-receiving chamber, for damping vibrations applied to the elastic mount. In this case, the plate-like member may include a base portion, and be secured at the base portion thereof to the inner sleeve, the plate-like member partially defining the restricted portion of the pressure-receiving chamber.

In a further embodiment of the invention, the elastic mount further comprises a rubber layer partially covering the inner sleeve, and the recess-defining means is in pressed contact with the inner sleeve via the rubber layer, so as to preliminarily compress the elastic body between the inner and outer sleeves.

BRIEF DESCRIPTION OF THE DRAWINGS

The above and optional objects, features and advantages of the present invention will be better understood by reading the following detailed description of presently preferred embodiments of the invention, when considered in conjunction with the accompanying drawings, in which:

FIG. 5 is a view corresponding to FIG. 1, showing a rubber sleeve of the elastic mount of FIG. 1;

FIG. 6 is a view taken along line VI—VI of FIG. 5, showing the rubber sleeve of FIG. 5;

FIG. 7 is an enlarged cross-sectional fragmentary view illustrating the processes of assembling the rubber sleeve and an outer sleeve to the vulcanized unit;

DETAILED DESCRIPTION OF THE PREFERRED EMBODIMENTS

Referring to FIGS. 1 through 7, there is shown the first embodiment of the fluid-filled cylindrical elastic mount of the present invention in the form of an engine mount for a front-engine front-drive motor vehicle.

Figure 1:
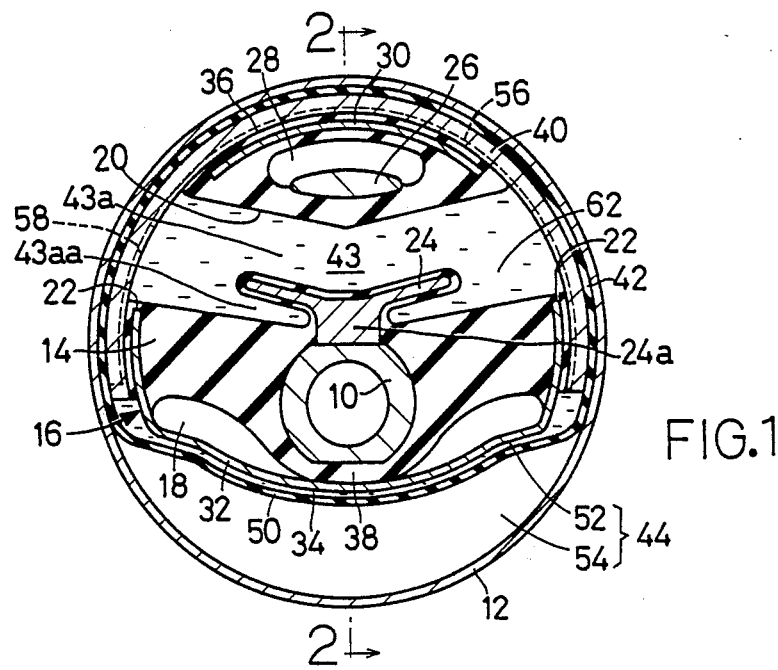
FIG. 1 is an elevational view in transverse cross section of one embodiment of a fluid-filled cylindrical elastic mount of the invention.
Figure 2:
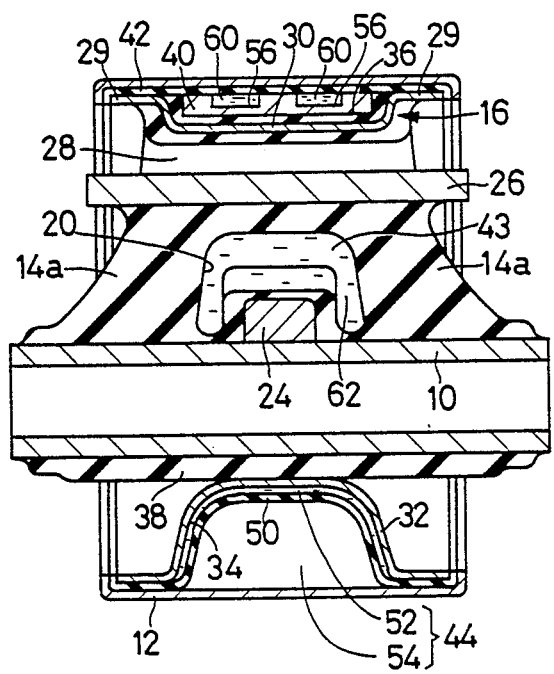
FIG. 2 is an elevational view in axial cross section of the elastic mount of FIG. 1, taken along line II—II of FIG. 1.

In FIGS. 1 and 2, reference numerals 10 and 12 respectively designate an inner sleeve, and an outer sleeve disposed outwardly of the inner sleeve such that the two sleeves are eccentric with each other by a predetermined amount in a diametric direction of the engine mount (hereinafter, referred to as the "eccentric" direction), namely, vertically as viewed in FIG. 1. A longitudinal axis of the inner sleeve 10 extends parallel to a longitudinal axis of the outer sleeve 12. The inner and outer sleeves 10, 12 are formed of metal. The inner and outer sleeves 10, 12 are elastically connected to each other by a generally semi-cylindrical elastic member 14 of a rubber material interposed therebetween. A substantial portion of the elastic member 14 is disposed on one of opposite diametric sides of the inner sleeve 10 on which the distance between the center of the inner sleeve 10 and the circumference of the outer sleeve 12 is larger than that on the other side as viewed in the above-indicated eccentric direction.

In the present embodiment, the inner sleeve 10 is attached to a body of the vehicle via a connecting rod provided therebetween, more specifically with the connecting rod extending through the inner sleeve 10. Meanwhile, the outer sleeve 12 is attached to a power unit of the vehicle via a bracket provided therebetween, specifically with the outer sleeve 12 press-fitted in an attachment hole of the bracket. Thus, the power unit is mounted on the vehicle via the engine mount, so that the engine mount damps and absorbs vibrations transmitted thereto. The elastic member 14 is adapted to be elastically compressed between the inner and outer sleeves 10, 12 in the eccentric direction, so that the two sleeves 10, 12 are held in substantially concentric or coaxial relationship with each other, with the wight of the power unit of the vehicle applied to the engine mount, i.e., while the engine mount is installed in place on the vehicle for flexible connection of the power unit to the vehicle body. A vibrational load is applied to the engine mount primarily in the eccentric direction.

Figure 3:
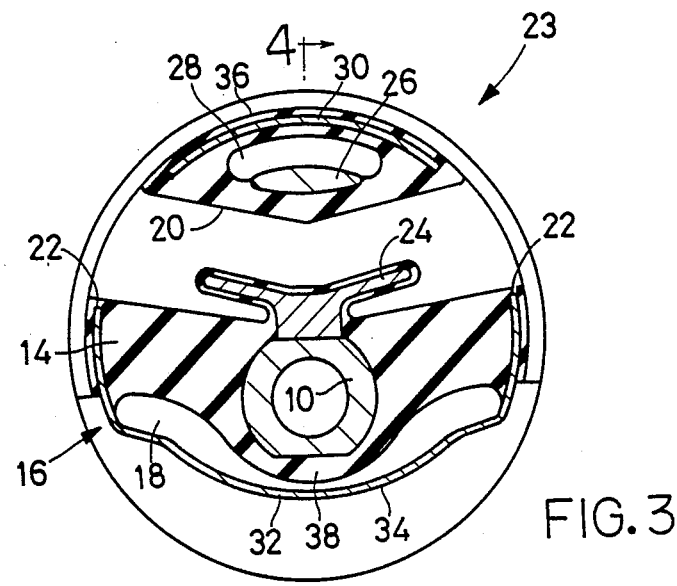
FIG. 3 is a view corresponding to FIG. 1, showing an integrally vulcanized unit of the elastic mount of FIG. 1.
Figure 4:
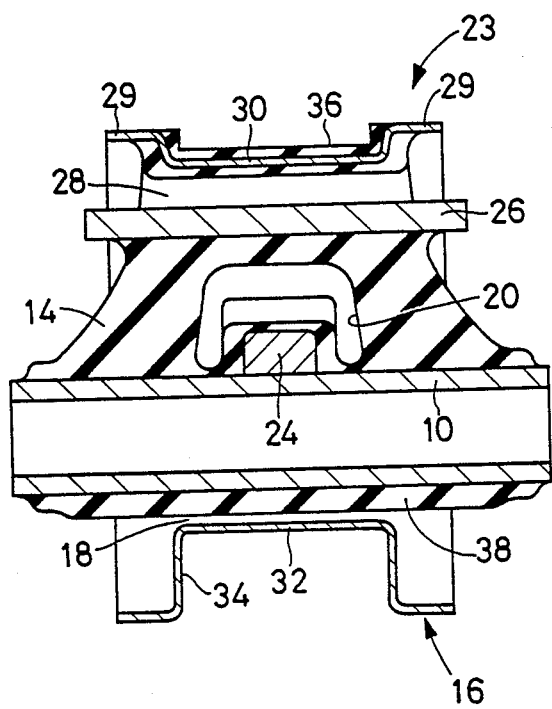
FIG. 4 is a view taken along line IV—IV of FIG. 3, showing the vulcanized unit of FIG. 3.
Figure 8:
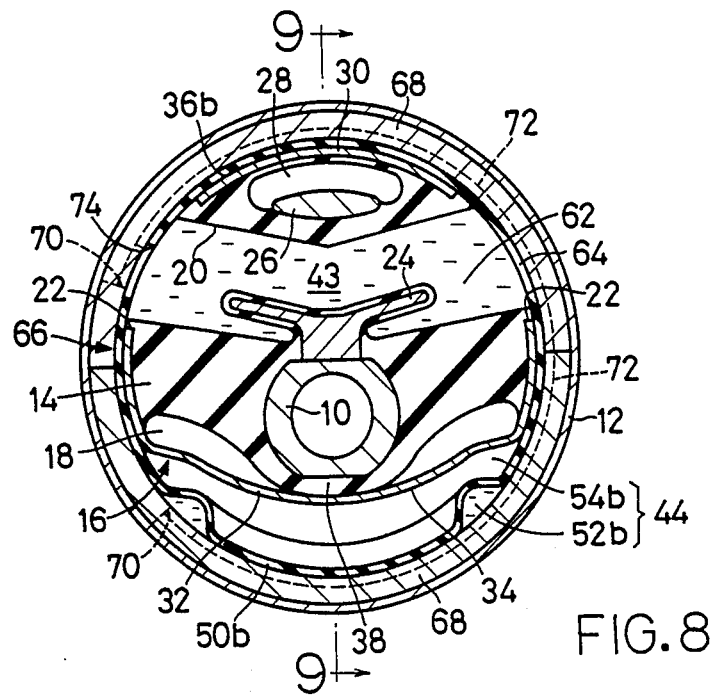
FIG. 8 is an elevational view in transverse cross section of another embodiment of the elastic mount of the present invention.
Figure 9:
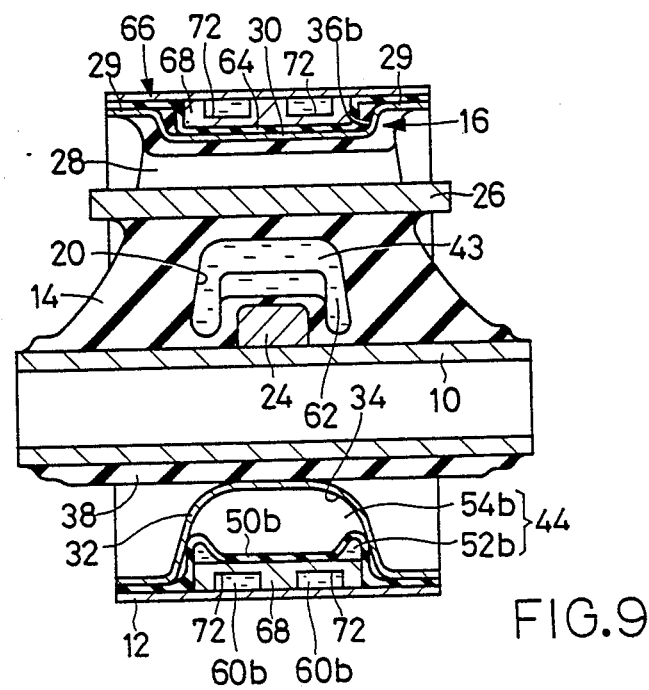
FIG. 9 is an elevational view in axial cross section of the elastic mount of FIG. 8, taken along line IX—IX of FIG. 8.
Figure 10:
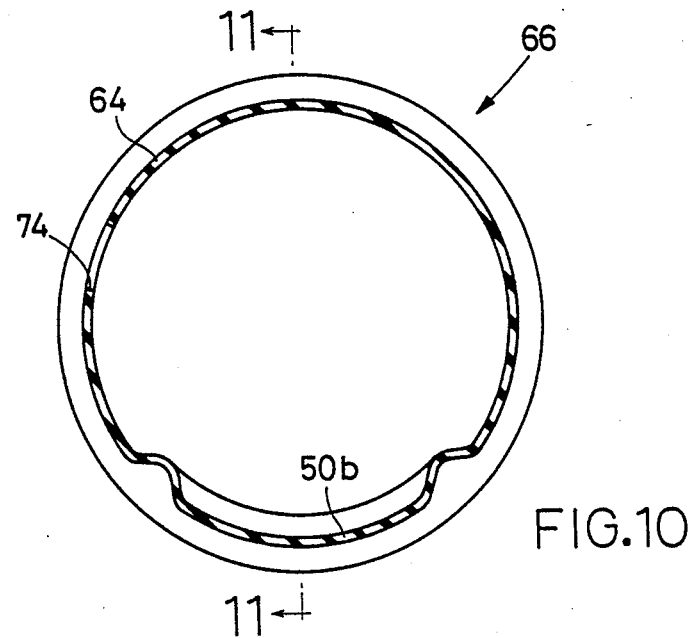
FIG. 10 is a view corresponding to FIG. 8, showing a rubber sleeve of the elastic mount of FIG. 8.
Figure 11:
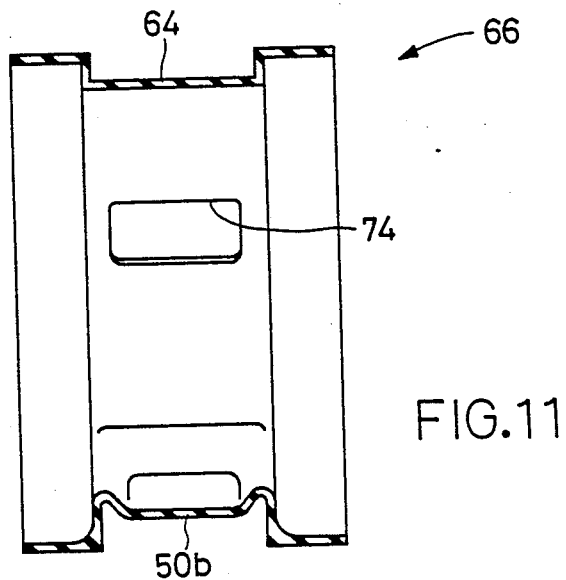
FIG. 11 is a view taken along line XI—XI, showing the rubber sleeve of FIG. 10.

More specifically described, the inner sleeve 10 has a comparatively thick, cylindrical wall. A metallic sleeve 16 having a comparatively thin, generally cylindrical wall is disposed radially outwardly of the inner sleeve 10, such that the two sleeves 10, 16 are eccentric with each other by a predetermined distance. A longitudinal axis of the metallic sleeve 16 extends parallel to the longitudinal axis of the inner sleeve 10. Referring to FIGS. 3 and 4, there is shown the elastic member 14 disposed between the inner and metallic sleeves 10, 16. The elastic member 14 is secured to an outer circumferential surface of the inner sleeve 10 and a generally half portion of an inner circumferential surface of the metallic sleeve 16 in a vulcanization, so as to provide an integrally vulcanized intermediate unit 23.

As described above, a substantial portion of the elastic mount 14 is located on one of the opposite diametric sides of the inner sleeve 10 as viewed in the above-indicated eccentric direction. On the other side of the inner sleeve 10 on which the distance between the center of the inner sleeve 10 and the circumference of the outer sleeve 12 is smaller, there is formed an axial recess 18 which extends over an entire length of the elastic member 14 in an axial direction of the engine mount. As shown in FIG. 1, the axial recess 18 has a generally semi-circular shape as viewed in transverse cross section of the engine mount. This arrangement contributes to minimizing tensile stress produced in a portion of the elastic member 14 which portion is adjacent to the axial recess 18, when the elastic member 14 is elastically deformed in the eccentric direction with the power unit mounted on the vehicle via the engine mount, namely, with the weight of the power unit applied to the engine mount.

The elastic member 14 has a cavity 20 which is formed therethrough. The cavity 20 is diametrically opposite to the axial recess 18 with respect to the inner sleeve 10, and is substantially perpendicular to the eccentric direction of the engine mount and to the axial direction of the same. The cavity 22 opens in the outer circumferential surface of the elastic member 14. The metallic sleeve 16 has a pair of openings 22, 22 aligned with the cavity 20. Thus, the cavity 20 opens in an outer circumferential surface of the vulcanized unit 23.

A plate-like member 24 is disposed in the cavity 20 such that the plate-like member 24 is supported at a base portion 24a thereof by the inner sleeve 10. The plate-like member 24 has a generally rectangular head portion, and is positioned in the cavity 20 so as to divide the volume of the cavity 20 into two sections which are spaced apart from each other in the eccentric direction of the engine mount. The rectangular head portion of the plate-like member 24 extends at a predetermined height as measured from the inner sleeve 10 in the eccentric direction, and is spaced apart from the inner wall surface defining the cavity 20.

The elastic member 14 has an axial void 28 formed therethrough in the axial direction of the engine mount. The second void is positioned radially outwardly of the cavity 20 and extends a predetermined length circumferentially along the inner surface of the metallic sleeve. A rigid restrictor rod 26 with an oval cross section extends through the elastic member 14 in the axial direction of the engine mount such that the restrictor rod 26 is partially embedded in a portion of the elastic member 14 which portion is located between the cavity 20 and the axial void 28, and partially exposed to the axial void 28. The axial void 28 and the restrictor rod 26 cooperate with each other to minimize irregular axially outward expansion of opposite side walls 14a, 14a of the elastic member 14 which define the axial ends of the cavity 20, when the weight of the power unit is applied to the engine mount with the power unit mounted on the vehicle via the engine mount, or when a vibrational load is applied to the engine mount. Even upon application of a large vibrational load to the engine mount, the above-indicated combination of the axial void 28 and the restrictor rod 26 serve to cause an appropriate variation in the volume of the cavity 20.

The metallic sleeve 16 includes opposite axial end portions 29, 29 of a large diameter. The large-diameter end portions 29 of the metallic sleeve 16 are located over the outer circumferential surface of opposite axial end portions of the elastic member 14. The metallic sleeve 16 further includes an axially intermediate portion 30 of a small diameter, such that a generally annular recess is provided radially outwardly of the small-diameter intermediate portion 30. A portion of the small-diameter intermediate portion 30 which portion is exposed to the axial recess 18, is deformed radially inwardly so as to provide a recess-defining portion 32. The recess-defining portion 32 defines a recess 34 which opens in the outer circumferential surface of the vulcanized unit 23, as most clearly shown in FIG. 3. Thus, the axial recess 18 is divided by the recess-defining portion 32 into a pair of inner and outer sections, and the outer section serves as the recess 34. Opposite circumferential ends of the recess 34 communicate with each other via a generally semi-annular recess defined by the remaining portion of the small-diameter intermediate portion 30 which portion is embedded in the elastic member 14.

As described above, in the present embodiment, after vulcanization of the intermediate unit 23, the metallic sleeve 16 is deformed radially inwardly so as to form the recess-defining portion 32 which has a large volume as shown in FIGS. 1 and 2. When the recess-defining portion 32 is formed, the portion 32 is brought into pressed contact with the inner sleeve 10, so that the inner sleeve 10 is displaced in the above-indicated eccentric direction and the elastic member 14 is preliminarily compressed between the inner and metallic sleeves 10, 16 in the eccentric direction, namely, in the direction in which a static load is applied to the elastic member 14 with the power unit mounted on the vehicle via the engine mount. The process of deforming the recess-defining portion 32 radially inwardly is carried out concurrently with a process of drawing the metallic sleeve 16 with, for example, commonly used eight-part (or octagonal) die for the purpose of eliminating stress produced in the elastic member 14 due to shrinkage thereof upon the vulcanization as well as improving bonding strength of the elastic member 14 to the inner and metallic sleeves 10, 16. A portion of the outer circumferential surface of the inner sleeve 10 which portion is brought into pressed contact with the recess-defining portion 32, is covered with a rubber layer 38 formed integral with the elastic member 14.

Subsequently, an orifice-defining member 40 having a generally semi-cylindrical configuration is fitted in the semi-annular recess 36 of the small-diameter portion 30 of the metallic sleeve 16 via a thin rubber layer integral with the elastic member 14, as shown in FIGS. 1 and 2. Further, a thin rubber sleeve 42 is disposed on the outer circumferential surface of the drawn and deformed unit 23. The outer sleeve 12 is disposed on an outer circumferential surface of the rubber sleeve 42. The outer sleeve 12 disposed on the intermediate unit 23 via the rubber sleeve 42 is subjected to drawing so as to be press-fitted at opposite axial end portions thereof on the corresponding large-diameter portions 29, 29 of the metallic sleeve 16. Opposite axial ends of the outer sleeve 12 are roll-caulked radially inwardly, and are engaged with opposite axial ends of the metallic sleeve 16.

The rubber sleeve 42 has on each of opposite axial end portions thereof a pair of annular sealing lips 46, 46 extending over a circumferential length of the outer circumferential surface thereof, as shown in FIG. 6. The axial end portions of the rubber sleeve 42 is compressed between the outer sleeve 12 and the metallic sleeve 16, so to assure fluid-tight sealing between the two sleeves 12, 16.

The rubber sleeve 42 has an axial length greater a suitable amount than that of the metallic sleeve 16, as shown in FIG. 7. The rubber sleeve 42 has on each of opposite ends thereof an annular protrusion 48 extending over the circumferential length of the outer circumferential surface thereof. When the axial ends of the outer sleeve 12 are caulked to engage the axial ends of the metallic sleeve 16, the annular protrusions 48, 48 are sandwiched between the corresponding pairs of axial ends of the two sleeves 12, 16.

When the orifice-defining member 40, rubber sleeve 42 and outer sleeve 12 are assembled to the intermediate unit 23, the cavity 20 opening in the outer circumferential surface of the product 23 is covered at both opening ends thereof by the orifice-defining member 40 to provide a first fluid chamber 43. Further, the recess 34 of the recess-defining portion 32 of the metallic sleeve 16 is covered by the outer sleeve 12 to provide a space 44 of a predetermined volume.

A portion of the rubber sleeve 42 which is aligned with the space 44, is spaced apart from the outer sleeve 12 into the space 44, so as to provide a flexible diaphragm 50. Thus, the flexible diaphragm 50 divides the space 44 into into a pair of radially inner and outer sections 52, 54. The radially inner section 52 serves as a second fluid chamber, while the radially outer section 54 serves as a chamber for permitting the flexible diaphragm 50 to be deformed or expanded thereinto.

The orifice-defining member 40 has a pair of circumferential grooves 56, 56 in an outer circumferential surface thereof. The circumferential grooves 56, 56 are fluid-tightly covered by the rubber sleeve 42 and the outer sleeve 12. Each of the circumferential grooves 56, 56 is held in fluid communication with the first fluid chamber 43 via a communication hole 58 formed in one of opposite circumferential end portions of the orifice-defining member 40, and in fluid communication with the second fluid chamber 52 at a circumferential end thereof on the side of the other circumferential end portion of the member 40. Thus, a pair of orifices 60, 60 are provided, which permit fluid communication between the first and second fluid chambers 43, 52.

The first and second fluid chambers 43, 52 and orifices 60, 60 are filled with a suitable non-compressible fluid, such that the orifice-defining member 40 and the rubber and outer sleeves 42, 12 are assembled to the intermediate product 23 in a container filled with the non-compressible fluid. As the non-compressible fluid, may be used various fluids such as water, alkylene glycol, polyalkylene glycol, and silicone oil.

In the engine mount constructed as described above, upon application of vibrations thereto, the volume of the first fluid chamber 43 or fluid pressure in the first chamber 43 is changed due to elastic deformation of the elastic member 14. Thus, the first fluid chamber 43 serves as a pressure-receiving chamber for receiving the vibrational load to be damped by the engine mount. Meanwhile, the second fluid chamber 52 communicating with the first fluid chamber 43 via the orifices 60, 60, is permitted to be changed in volume due to elastic deformation of the flexible diaphragm 50, so that the fluid pressure in the second chamber 52 is not changed. Thus, the second fluid chamber 52 serves as an equilibrium chamber for accommodating the pressure change produced in the pressure-receiving chamber 43. The first fluid chamber 43 serving as the pressure-receiving chamber, is divided by the plate-like member 24 into the pair of sections 43a, 43aa which communicate with each other via a generally annular restricted portion 62 defined by the periphery of the plate-like member 24 and the inner surfaces of the elastic member 14 and orifice-defining member 40.

Upon input of vibrations to the instant engine mount, the orifices 60, 60 provides a resistance to flows of the fluid therethrough between the first and second fluid chambers 43, 52, and the restricted portion 62 in the first fluid chamber 43 provides a resistance to flows of the fluid therethrough between the pair of sections 43a, 43aa, so as to damp the vibrations. Further, a mass of the fluid existing in each of the orifices 60, 60 and restricted portion 62, resonates with vibrations in a given frequency range and thereby damps the vibrations. The configuration and dimensions of each of the orifices 60 and restricted portion 62 are tuned to damp vibrations in a predetermined frequency range. For example, the orifice 60 has a predetermined cross section of flow and a predetermined length. In the present embodiment, the orifices 60, 60 are tuned to damp a comparatively low frequency range of vibrations such as engine shake based on the resistance thereof to the flows of the fluid therethrough. Meanwhile, upon application of a middle or a high frequency range of vibrations, such as booming noises or transmitted engine sounds, when the masses of the fluid in the orifices 60, 60 become rigid and unable to flow, the instant engine mount exhibits a low dynamic-spring effect based on the resistance of the restricted portion 62 to the flows of the fluid therethrough.

As described above, the second fluid chamber 52 is provided in the space 44 defined between the metallic sleeve 16 and the outer sleeve 12. The expansion of the flexible diaphragm 50 upon flowing of the fluid into the second fluid chamber 52, is advantageously limited by contact of the diaphragm 50 with the outer sleeve 12. Thus, when an excessively large vibrational load is applied to the instant engine mount, an excessive deformation of the flexible diaphragm 50 is prevented. This leads to improving the durability and reliability of the flexible diaphragm 50, and accordingly those of the engine mount as a whole.

In the instant engine mount, the flexible diaphragm 50 is formed as a portion of the rubber sleeve 42 for fluid-tight sealing between the metallic sleeve 16 and the outer sleeve 12. This results in reducing the number of parts and processes required for manufacturing the engine mount. Thus, the instant engine mount has a simple construction, and is manufactured at low cost.

In the illustrated embodiment, after vulcanization of the elastic member 14 to the inner and metallic sleeves 10, 16, the metallic sleeve 16 is worked to form the recess-defining portion 32 such that the recess-defining portion 32 is brought into pressed contact with the inner sleeve 10. Therefore, the space 44 has a comparatively large volume, and accordingly the chamber 54 has a large variable volume for permitting the expansion of the flexible diaphragm 50. The preliminary compression of the elastic member 14 between the inner and metallic sleeves 10, 16 in the eccentric direction, i.e. the direction in which the static load of the power unit is applied to the engine mount, carried out prior to charging the cavity 20 with the non-compressible fluid, contributes to effectively reducing the amount of deformation of the elastic member 14 when the power unit is mounted on the vehicle via the engine mount, namely, the amount of change in the volume of the first fluid chamber 43, and accordingly the amount of the expansion of the flexible diaphragm 50 partially defining the second fluid chamber 52. Thus, the durability of the flexible diaphragm 50 is further improved, and the variable column of the second fluid chamber 52 is increased.

Furthermore, the pressed contact of the recess-defining portion 32 of the metallic sleeve 16 with the inner sleeve 10, serves to limit displacement of the inner sleeve 10 relative to the outer sleeve 12 in a downward direction as seen in FIG. 1 upon application of an excessively large vibrational load to the engine mount, thereby improving the durability of the elastic member 14.

Referring next to FIGS. 8 through 11 there is shown another embodiment of the engine mount of the invention. The same reference numerals as used in FIGS. 1 through 7 are used to denote corresponding elements or portions of the embodiment shown in FIGS. 8 through 11. Redundant description of those elements or portions are abbreviated.

The instant engine mount has a rubber sleeve 66 in place of the rubber sleeve 42 of the preceding embodiment of FIGS. 1-7. The rubber sleeve 66 includes an intermediate stepped portion 64 with a diameter smaller than that of opposite axial end portions thereof, as clearly shown in FIG. 11. The rubber sleeve 66 is disposed on the outer circumferential surface of the vulcanized unit 23, with the intermediate stepped portion 64 fitted in the circumferential recess 36 of the unit 23.

A cylindrical orifice-defining member which consists of a pair of separate simi-cylindrical halves 68, 68, are accommodated in the small-diameter stepped portion 66 of the rubber sleeve 64 disposed on the vulcanized unit 23. Each of the pair of halves 68, 68 has at one of opposite circumferential end portions thereof a pair of communication holes 70, 70 opening radially inwardly, and a pair of generally semi-circular grooves 72, 72 formed in an outer circumferential surface thereof and extending from the corresponding holes 70, 70 to a circumferential end thereof located on the side of the other circumferential end portion. Subsequently, the outer sleeve 12 is disposed on the rubber sleeve 64 and the orifice-defining halves 68, 68. Thus, the outer sleeve 12 covers the semi-circular grooves 72, 72 of the halves 68, 68, thereby providing a pair of orifices 60b, 60b which extends over a length slightly shorter than the circumference of the engine mount.

The orifices 60b, 60b communicates with the first fluid chamber 43 via the communication holes 70, 70 formed in one of the pair of cylindrical halves 68 and an opening 74 formed in the rubber sleeve 64. Meanwhile, the orifices 60b, 60b communicates with a space 52b defined by a flexible diaphragm 50b of the rubber sleeve 64 and the other of the pair of cylindrical halves 68 via the communication holes 70, 70 of the other cylindrical half 68. More specifically described, the metallic sleeve 16 and the outer sleeve 12 define a space 44 therebetween which is divided by the flexible diaphragm 50b into a pair of radially inner and outer sections 54b, 52b, and the radially outer section 52b serves as the second fluid chamber for the instant engine mount which chamber is filled with a non-compressible fluid. Meanwhile, the radially inner section 54b serves as a chamber for accommodating the expansion or deformation of the flexible diaphragm 50b upon flowing of the fluid from the first fluid chamber 43 into the second fluid chamber 52b.

In the instant engine mount constructed as described above, upon application of vibrations thereto, the elastic deformation of the elastic member 14 and the fluid resistances of the orifices 60b, 60b and restricted portion 62, serve to effectively damp the vibrations. Further, upon input of an excessively large vibrational load, the flexible diaphragm 50b is advantageously prevented from excessively large expansion or deformation thereof by eventually contacting with the recess-defining portion 32 of the metallic sleeve 16. Therefore, the durability of the flexible diaphragm 50b is improved. Thus, the instant engine mount has the same advantages as those of the embodiment of FIGS. 1-7.

While two presently preferred embodiments of the present invention has been described for illustrative purpose only, it is to be understood that the invention is not limited to details of the illustrated embodiments, but the invention may be otherwise embodied.

Figure 12:
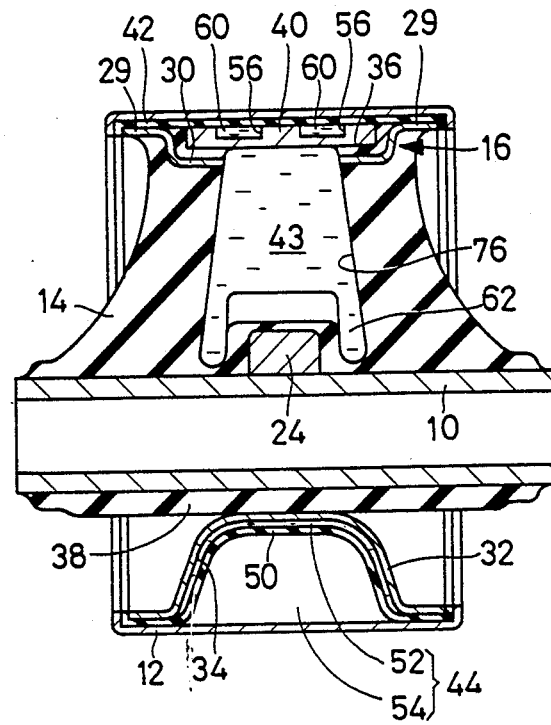
FIG. 12 is an elevational view in axial cross section of yet another embodiment of the elastic mount of the invention.

For example, the first and second fluid chambers and orifices for the engine mount are not limited to the configurations of the illustrated embodiments. For example, as shown in FIG. 12, the first fluid chamber 43 may be constituted by a pocket 76 formed in the elastic member 14 such that the pocket 76 has a bottom on the side of the inner sleeve 10 and opens in the outer circumferential surface of the elastic member 14. In FIG. 12 the same reference numerals as used in FIGS. 1-7 are used to designate corresponding parts or portions of the instant engine mount.

While the illustrated engine mounts have the single pressure-receiving chamber and the single equilibrium chamber, it is possible to provide the engine mount with a plurality of the first or second fluid chambers serving as the pressure-receiving or equilibrium chambers, respectively.

Further, it is possible to employ a metallic sleeve (16) consisting of a pair of semi-cylindrical halves. In this case, it is recommended that one of the pair of semi-cylindrical halves which defines the recess 34, be assembled to a vulcanized unit formed by vulcanization of the elastic member 14 to the inner sleeve 10 and the other semi-cylindrical half, such that the recess-defining semi-cylindrical half is brought into pressed contact with the inner sleeve 10.

Moreover, it is possible to use a recess-defining member for defining the recess 44, independent of the metallic sleeve 16. In this case, the recess-defining member may be assembled to the integrally vulcanized unit 23. Also in this case, the metallic sleeve may be constituted by a pair of cylindrical members which are secured to opposite axial end portions of the elastic member 14.

Furthermore, it will be understood that the principle of the present invention may be applicable to other vibration-damping mounting devices and connecting devices such as automotive suspension bushings, in addition to the illustrated automotive engine mounts.

It will be obvious that the present invention may be embodied with various other changes, modifications and improvements, which may occur to those skilled in the art, without departing from the spirit and scope of the invention defined in the following claims.

What is claimed is:

1. A fluid-filled cylindrical elastic mount comprising:
an inner sleeve;
an outer sleeve disposed outwardly of said inner sleeve such that an axis of said inner sleeve and an axis of said outer sleeve are parallel to each other;
an elastic body interposed between said inner and outer sleeves for elastic connection therebetween;
rigid sleeve means disposed over at least an outer circumferential surface of opposite axial end portions of said elastic body, said outer sleeve being fitted on said elastic body via said rigid sleeve means;
means for defining a pressure-receiving chamber between said inner and outer sleeves, said pressure-receiving chamber being filled with a non-compressible fluid, and receiving a vibrational load to be damped by the elastic mount;
means for defining an equilibrium chamber between said inner and outer sleeves, said equilibrium chamber being filled with said non-compressible fluid, and at least partially defined by a flexible wall;
means for defining a restricted passage for restricted fluid communication between said pressure-receiving and equilibrium chambers;
recess-defining means disposed between said inner and outer sleeves, for defining a radially outwardly opening recess, said outer sleeve covering said recess to provide a space of a predetermined volume;
an elastic sleeve for fluid-tight sealing between said outer sleeve and said rigid sleeve means; and
a portion of said elastic sleeve which is aligned with said space, being spaced apart from said outer sleeve so as to provide a flexible diaphragm in said space, said flexible diaphragm serving as said flexible wall, said equilibrium chamber being provided in said space.

2. The elastic mount as set forth in claim 1, wherein said recess-defining means is formed integral with said rigid sleeve means, so as to provide a generally cylindrical rigid member.

3. The elastic mount as set forth in claim 1, wherein said equilibrium chamber is defined by said flexible diaphragm and said recess-defining means.

4. The elastic mount as set forth in claim 3, wherein said means for defining a restricted fluid passage is provided between said elastic sleeve and said elastic member.

5. The elastic mount as set forth in claim 4, wherein said means for defining a restricted passage comprises a circumferential recess formed in an outer circumferential surface of an intermediate portion of said elastic body, and a cylindrical passage-defining member fitted in said circumferential recess, said cylindrical passage-defining member cooperating with said elastic sleeve to define said restricted passage which communicates with said pressure-receiving and equilibrium chambers.

6. The elastic mount as set forth in claim 1, wherein said equilibrium chamber is defined by said elastic diaphragm and said outer sleeve.

7. The elastic mount as set forth in claim 6, wherein said means for defining a restricted fluid passage is provided between said elastic sleeve and said outer sleeve.

8. The elastic mount as set forth in claim 1, wherein said means for defining a restricted passage comprises a circumferential recess formed in an outer circumferential surface of an intermediate portion of said elastic body, and a cylindrical passage-defining member fitted in said circumferential recess via said elastic sleeve disposed therebetween, said cylindrical passage-defining member cooperating with said outer sleeve to define said restricted passage which communicates with said pressure-receiving and equilibrium chambers.

9. The elastic mount as set forth in claim 1, wherein said pressure-receiving chamber and said equilibrium chamber are provided opposite to each other in a diametric direction in which the elastic mount primarily receives vibrations.

10. The elastic mount as set forth in claim 9, wherein said inner and outer sleeves are eccentric with each other in said diametric direction.

11. The elastic mount as set forth in claim 1, further comprising a restrictor member extending through said elastic body in an axial direction of the elastic body, wherein said elastic body has an axial void formed therethrough, said restrictor member being extending through said axial void.

12. The elastic mount as set forth in claim 1, wherein said elastic body has an axial recess which is divided by said recess-defining means into a pair of inner and outer sections, said outer section serving as said radially outwardly opening recess.

13. The elastic mount as set forth in claim 1, wherein said pressure-receiving chamber has a restricted portion which provides a resistance to a flow of said non-compressible fluid from one part of said pressure-receiving chamber to another.

14. The elastic mount as set forth in claim 13, further comprising a plate-like member exposed to said pressure-receiving chamber, for damping vibrations applied to the elastic mount.

15. The elastic mount as set forth in claim 14, wherein said plate-like member includes a base portion, is secured at said base portion thereof to said inner sleeve, and partially defines said restricted portion of said pressure-receiving chamber.

16. The elastic mount as set forth in claim 1, further comprising a rubber layer partially covering said inner sleeve, wherein said recess-defining means is in pressed contact with said inner sleeve via said rubber layer, so as to preliminarily compress said elastic body between said inner and outer sleeves.

* * * * *